United States Patent
Abe et al.

(10) Patent No.: US 7,366,867 B2
(45) Date of Patent: Apr. 29, 2008

(54) COMPUTER SYSTEM AND STORAGE AREA ALLOCATION METHOD

(75) Inventors: Shigeru Abe, Kawasaki (JP); Daisuke Shinohara, Yokohama (JP); Hirotaka Nakagawa, Fujisawa (JP); Masauyki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 234 days.

(21) Appl. No.: 11/268,793

(22) Filed: Nov. 7, 2005

(65) Prior Publication Data

US 2007/0055842 A1 Mar. 8, 2007

(30) Foreign Application Priority Data

Sep. 6, 2005 (JP) .............................. 2005-257797

(51) Int. Cl.
*G06F 12/02* (2006.01)

(52) U.S. Cl. ...................... 711/171; 711/170; 711/112; 711/114; 711/165

(58) Field of Classification Search ................ 711/112, 711/114, 165, 170–173
See application file for complete search history.

(56) References Cited

U.S. PATENT DOCUMENTS 7,181,516 B2 * 2/2007 Kaneda et al. .............. 709/223

2005/0022201 A1 1/2005 Kaneda et al.
2005/0154852 A1 7/2005 Nakagawa et al.

FOREIGN PATENT DOCUMENTS

JP 2005-025422 A 1/2005
JP 2005-228278 A 8/2005

* cited by examiner

*Primary Examiner*—Matthew Kim
*Assistant Examiner*—Hetul Patel
(74) *Attorney, Agent, or Firm*—Townsend and Townsend and Crew LLP

(57) ABSTRACT

A burden placed on an administrator in creating a volume is reduced. An evaluation hint value and a performance hint value are employed as hint values for each hint. The evaluation hint value is determined by the administrator considering a service usage and the like of the service server 1 to which the volume is allocated. The performance hint value is used to determine a performance and a setting of the volume to be created in the storage system 3. The management server 2 has a conversion table indicating a correspondence between the evaluation hint value defined considering the hardware configuration and the performance hint value, with respect to each storage system 3. The management server 2 converts the evaluation hint value designated by the administrator to a performance hint value, by use of the conversion table associated with the storage system to which the volume is to be created, and the management server creates the volume in the storage system 3 according to the performance value.

13 Claims, 13 Drawing Sheets

FIG. 5A

CONVERSION TABLE BY USAGE
(DATA AVAILABILITY) 224A

| USAGE | EVALUATION HINT VALUE | | | | | | | | | |
|---|---|---|---|---|---|---|---|---|---|---|
|  | 0 | 1 | 2 | 3 | 4 | 5 | 6 | 7 | 8 | 9 |
| ARCHIVE (SAVE) | 5 | 6 | 6 | 7 | 7 | 8 | 8 | 9 | 9 | 10 |
| SERVICE DB (SEARCH) | 0 | 1 | 1 | 2 | 2 | 3 | 3 | 4 | 4 | 5 |

CONVERSION TABLE BY USAGE
(ACCESS LATENCY) 224B

| USAGE | EVALUATION HINT VALUE | | | | | | | | | |
|---|---|---|---|---|---|---|---|---|---|---|
|  | 0 | 1 | 2 | 3 | 4 | 5 | 6 | 7 | 8 | 9 |
| ARCHIVE (SAVE) | 0 | 0 | 1 | 1 | 1 | 2 | 2 | 2 | 3 | 3 |
| SERVICE DB (SEARCH) | 5 | 6 | 6 | 7 | 7 | 8 | 8 | 9 | 9 | 10 |

FIG. 5C

CONVERSION TABLE BY USAGE
(ACCESS BANDWIDTH) 224C

| USAGE | EVALUATION HINT VALUE | | | | | | | | | |
|---|---|---|---|---|---|---|---|---|---|---|
|  | 0 | 1 | 2 | 3 | 4 | 5 | 6 | 7 | 8 | 9 |
| ARCHIVE (SAVE) | 0 | 0 | 1 | 1 | 2 | 2 | 3 | 3 | 4 | 4 |
| SERVICE DB (SEARCH) | 7 | 7 | 7 | 8 | 8 | 8 | 9 | 9 | 9 | 10 |

FIG. 6A

CONVERSION TABLE BY SYSTEM
(STORAGE SYSTEM S1) 225A

| HINT ITEM | INTERIM HINT VALUE | | | | | | | | | |
|---|---|---|---|---|---|---|---|---|---|---|
| | 0 | 1 | 2 | 3 | 4 | 5 | 6 | 7 | 8 | 9 |
| DATA AVAILABILITY | 0 | 5 | 5 | 5 | 5 | 5 | 8 | 8 | 8 | 8 |
| ACCESS LATENCY | 0 | 6 | 6 | 7 | 7 | 8 | 8 | 9 | 9 | 10 |
| ACCESS BANDWIDTH | 8 | 8 | 8 | 8 | 9 | 9 | 9 | 10 | 10 | 10 |

CONVERSION TABLE BY SYSTEM
(STORAGE SYSTEM S2) 225B

| HINT ITEM | INTERIM HINT VALUE | | | | | | | | | |
|---|---|---|---|---|---|---|---|---|---|---|
| | 0 | 1 | 2 | 3 | 4 | 5 | 6 | 7 | 8 | 9 |
| DATA AVAILABILITY | 0 | 1 | 2 | 3 | 4 | 5 | 6 | 7 | 8 | 9 |
| ACCESS LATENCY | 0 | 1 | 2 | 3 | 4 | 5 | 6 | 7 | 8 | 9 |
| ACCESS BANDWIDTH | 0 | 1 | 2 | 3 | 4 | 5 | 6 | 7 | 8 | 9 |

FIG. 7

SERVICE SERVER TABLE 226

| IP ADDRESS | SERVICE USAGE | MAXIMUM I/O PERFORMANCE | SETTING |
|---|---|---|---|
| 192.168.114.194 | ARCHIVE (SAVE) | 50MB/sec | CLUSTER (Active-Active) |

USED HINT TABLE 227

| VOLUME ID | USED HINT VALUE | ALLOCATION SERVER |
|---|---|---|
| Vo.1 | DATA AVAILABILITY : 3<br>ACCESS LATENCY : 10<br>ACCESS BANDWIDTH : 10 | 192.168.114.194 |
| Vo.2 | DATA AVAILABILITY : 3<br>ACCESS LATENCY : 5<br>ACCESS BANDWIDTH : 3 | 192.168.114.194 |

MAPPING TABLE BETWEEN HINT AND PERFORMANCE
(STORAGE SYSTEM S1) 228A

| ACCESS BANDWIDTH PERFORMANCE HINT VALUE (2281) | I/O PERFORMANCE (2282) |
|---|---|
| 0 | 25MB/sec |
| 1 | 25MB/sec |
| 2 | 50MB/sec |
| 3 | 50MB/sec |
| 4 | 75MB/sec |
| 5 | 75MB/sec |
| 6 | 100MB/sec |
| 7 | 150MB/sec |
| 8 | 200MB/sec |
| 9 | 300MB/sec |

FIG. 9B

MAPPING TABLE BETWEEN HINT AND PERFORMANCE
(STORAGE SYSTEM S2) 228B

| ACCESS BANDWIDTH PERFORMANCE HINT VALUE | I/O PERFORMANCE |
|---|---|
| 0 | 50MB/sec |
| 1 | 50MB/sec |
| 2 | 50MB/sec |
| 3 | 100MB/sec |
| 4 | 150MB/sec |
| 5 | 200MB/sec |
| 6 | 250MB/sec |
| 7 | 300MB/sec |
| 8 | 350MB/sec |
| 9 | 400MB/sec |

FIG. 10

CONVERSION TABLE BY SETTING 229

| SERVICE SERVER SETTING | DATA AVAILABILITY INTERIM HINT VALUE | | | | | | | | | |
|---|---|---|---|---|---|---|---|---|---|---|
| | 0 | 1 | 2 | 3 | 4 | 5 | 6 | 7 | 8 | 9 |
| STAND-ALONE | 5 | 6 | 6 | 7 | 7 | 8 | 8 | 9 | 9 | 10 |
| CLUSTER (Active-Passive) | 5 | 6 | 6 | 7 | 7 | 8 | 8 | 9 | 9 | 10 |
| CLUSTER (Active-Active) | 0 | 2 | 4 | 6 | 8 | 10 | 10 | 10 | 10 | 10 |

MAPPING TABLE BETWEEN HINT AND SETTING 323

| PERFORMANCE HINT VALUE | DATA AVAILABILITY | | ACCESS LATENCY | ACCESS BANDWIDTH |
|---|---|---|---|---|
| | RAID | REMOTE COPY | OPERATION MODE | USED NUMBER OF PORT |
| 0 | RAID 0 | NO | POWER-SAVING (CONSTANT) MODE | 1 |
| 1 | RAID 0 | NO | POWER-SAVING (CONSTANT) MODE | 1 |
| 2 | RAID 0 | NO | POWER-SAVING (NIGHTTIME) MODE | 1 |
| 3 | RAID 5 | NO | POWER-SAVING (NIGHTTIME) MODE | 1 |
| 4 | RAID 5 | NO | POWER-SAVING (NIGHTTIME) MODE | 2 |
| 5 | RAID 5 | NO | POWER-SAVING (NIGHTTIME) MODE | 2 |
| 6 | RAID 5 | NO | CONSTANT OPERATION MODE | 2 |
| 7 | RAID 5 | NO | CONSTANT OPERATION MODE | 2 |
| 8 | RAID 0+1 | YES | CONSTANT OPERATION MODE | 3 |
| 9 | RAID 0+1 | YES | CONSTANT OPERATION MODE | 3 |

US 7,366,867 B2

COMPUTER SYSTEM AND STORAGE AREA ALLOCATION METHOD

CROSS-REFERENCE TO THE RELATED APPLICATION

This application relates to and claims priority from Japanese Patent Application No. 2005-257797, filed on Sep. 6, 2005, the entire disclosure of which is incorporated herein by reference.

BACKGROUND

The present invention relates to a technique for controlling a storage area allocation in a storage system.

Japanese Patent Laid-open Publication No. 2005-25422 (hereinafter, referred to as "Patent Document 1") discloses a technique to allocate a volume of a storage system to a host, utilizing the interface defined by CIM (Common Information Model) that is established by DMTF (Distributed Management Task Force). In the Patent Document 1, a management computer accepts from an administrator, via GUI, a hint value of a hint applied to the volume which is to be created. Here, the "hint" represents guidance defined by the CIM for creating the volume. There are eight types of hints in total; Data Availability, Access Randomness, Access Direction, Access Size, Access Latency, Access Bandwidth, Storage Cost, and Storage Efficiency. The management computer creates in the storage system, a volume according to a hint value of the hint accepted from the administrator, and allocates the volume to the host designated by the administrator. For example, a volume is created employing RAID (Redundant Arrays of Inexpensive Disks) level, which has availability being associated with each of the hint values (e.g., represented by ten stages, from 0 to 9) for the hint "Data Availability" accepted from the administrator, and this volume is allocated to the host designated by the administrator.

By use of the hint, it is possible to abstractly designate a volume to be created. Furthermore, even when a hardware configuration of the storage system is different by vendor, it is possible to request the volume creation in a unified format.

As mentioned above, according to the technique described in the Patent Document 1, even when the hardware configuration of the storage system is different by vendor, it is possible to request the volume creation in a unified format.

However, in the case where the hardware configuration of the storage system is different by vendor, a performance and/or a setting of the volume created in the storage system may be different even for the same hint value of the same hint. For instance, it is assumed here that the same hint value of "Data Availability" is designated to each of the storage system S1 of the vendor A and to the storage system S2 of the vendor B, then, allowing the management computer to create a volume. For this case, there is a possibility that in the storage system S1, a volume structured with RAID 5 is created, and in the storage system S2, a volume is created to which a remote copy has been applied.

Therefore, it is necessary for the administrator to grasp in advance a meaning indicated by each hint value (performance and/or setting of the volume created based on each hint value), with respect to each storage system. Then, according to the meaning indicated by the hint value in each storage system, the administrator has to specify a storage system which is capable of creating a volume available for a service usage of the host, and to decide a hint value to create this available volume in this storage system. As the number of the vendors is increased, heavier burden is placed on the administrator.

The present invention has been made considering the above situation, and an object of the present invention is to provide a technique which is capable of reducing a burden on the administrator in creating a volume.

SUMMARY

In order to solve the above problem, the present invention employs an evaluation hint value and a performance hint value, as hint values for each hint. The evaluation hint value is determined by an administrator, considering a service usage and the like of the host to which the volume is allocated. The performance hint value is used to decide a performance and/or a setting of the volume which is created in the storage system. The management computer prepares in advance a conversion table which shows a correspondence between the evaluation hint value and the performance hint value, which are defined considering the hardware configuration of the storage system, with respect to each storage system. Then, the management computer converts the evaluation hint value designated by the administrator into a performance hint value, by use of the conversion table associated with the storage system in which a volume is to be created, and according to the performance hint value thus obtained, the volume is created in the storage system.

As a way of example, one aspect of the present invention is directed to a computer system having a host computer, at least one storage system which provides a volume to the host computer, a management computer connected via a network with the storage system and the host computer, wherein, the host computer includes, a first port for management which establishes connection with the management computer, a first port for storage which establishes connection with the storage system, a first processor, and a first memory, wherein, the first processor performs, a process which transmits a first volume creation request including a designation of an evaluation hint value and the storage system, to the management computer via the first port for management, and a process which accesses the volume via the first port for storage, according to a path received from the management computer via the first port for management, and the management computer includes, a second port for management which establishes connection with the network, a second processor, and a second memory, wherein, the second memory holds a conversion table by system, indicating a correspondence between an evaluation hint value and a performance hint value, with respect to each of the storage system, and the second processor performs, a process which converts the evaluation hint value included in the first volume creation request received from the host computer via the second port for management, into the performance hint value associated with the evaluation hint value, by use of the conversion table by system being associated with the storage system which is designated in the first volume creation request, a process which transmits a second volume creation request including the performance hint value thus converted to the storage system designated by the first volume creation request via the second management port, and a process which transmits a path between the volume created in the storage system designated by the first volume creation request and the host computer which transmitted the first volume creation request, to the host computer via the second port for management, and the storage system includes, a second port for storage which establishes connection with the host computer, a third port for management which establishes connection with the management computer, a third CPU, and a third memory, wherein, the third memory holds a mapping table between hint and setting which indicates a correspondence between the performance hint value and a volume setting, and the third CPU performs, a process which specifies, by use of the mapping table between hint and setting, the volume setting associated with the performance hint value included in the second volume creation request received from the management computer via the third port for management, and creates a volume having the volume setting thus specified, and a process which accepts an access from the host computer to the volume thus created via the second port for storage.

According to the present invention, it is not necessary for the administrator to grasp in advance a meaning indicated by each performance hint value (performance and/or setting of the volume created based on each performance hint value), with respect to each storage system. Therefore, it is possible to reduce the burden placed on the administrator in creating a volume.

BRIEF DESCRIPTION OF THE DRAWINGS

FIGS. 5A, 5B, and 5C are diagrams schematically showing conversion tables by usage 224A, 224B, and 224C.

FIG. 6A and FIG. 6B are diagrams schematically showing conversion tables by system 225A and 225B.

FIG. 7 is a diagram schematically showing a service server table 226.

FIG. 8 is a diagram schematically showing a used hint table 227.

FIG. 9A and FIG. 9B are diagrams schematically showing mapping tables between hint and performance 228A and 228B.

FIG. 10 is a diagram schematically showing a conversion table by setting 229.

FIG. 11 is a diagram schematically showing a mapping table between hint and setting 323.

DETAILED DESCRIPTION OF THE PREFERRED EMBODIMENTS

Hereinafter, preferred embodiments of the present invention will be explained.

First Embodiment

A computer system to which the first embodiment of the present invention is applied will be explained with reference to the accompanying drawings.

(1) System Configuration

Figure 1:
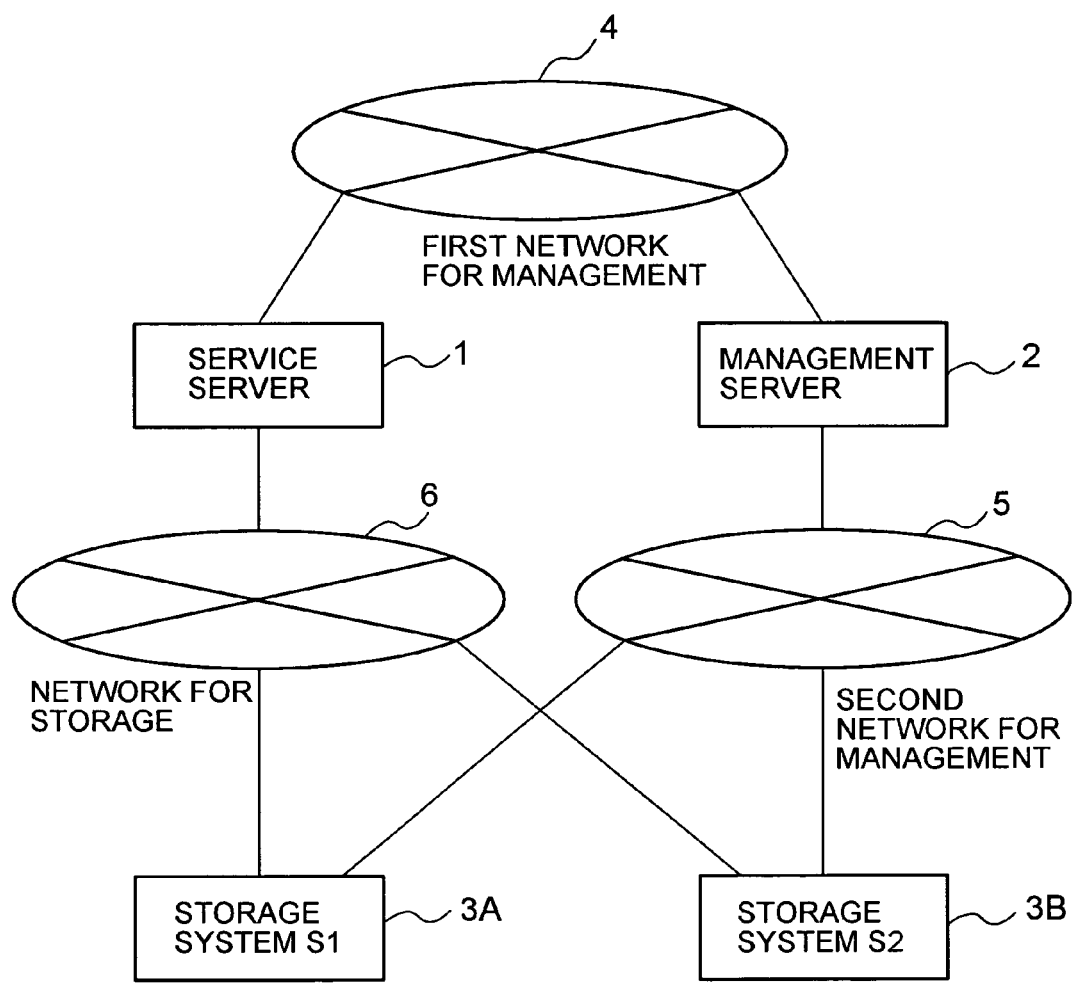
FIG. 1 is a schematic diagram of a computer system to which the first embodiment of the present invention is applied.

FIG. 1 is a schematic diagram of the computer system to which the first embodiment of the present invention is applied. As illustrated, the computer system according to the present embodiment includes service server 1, management server 2, and multiple storage systems 3. In FIG. 1, only one service server 1 is shown, but a plurality of service servers 1 may be applicable. Also in FIG. 1, two storage systems 3A, 3B are shown, but three or more storage systems may be applicable.

The service server 1 and the management server 2 are connected with each other, via the first network for management constructed with LAN or the like. Similarly, the management server 2 and the storage systems 3A and 3B are connected with one another via the second network for management 5 constructed with LAN or the like. The service server 1 and the storage systems 3A, 3B are connected with one another via the network for storage 6, such as SAN (Storage Area Network).

The service server 1 requests the management server 2 to allocate a volume which is used for service processing in the own device of service server 1. The service server 1 performs service processing by use of the volume of the storage system 3, which is allocated to the own device of service server 1 by the management server 2.

Figure 2:
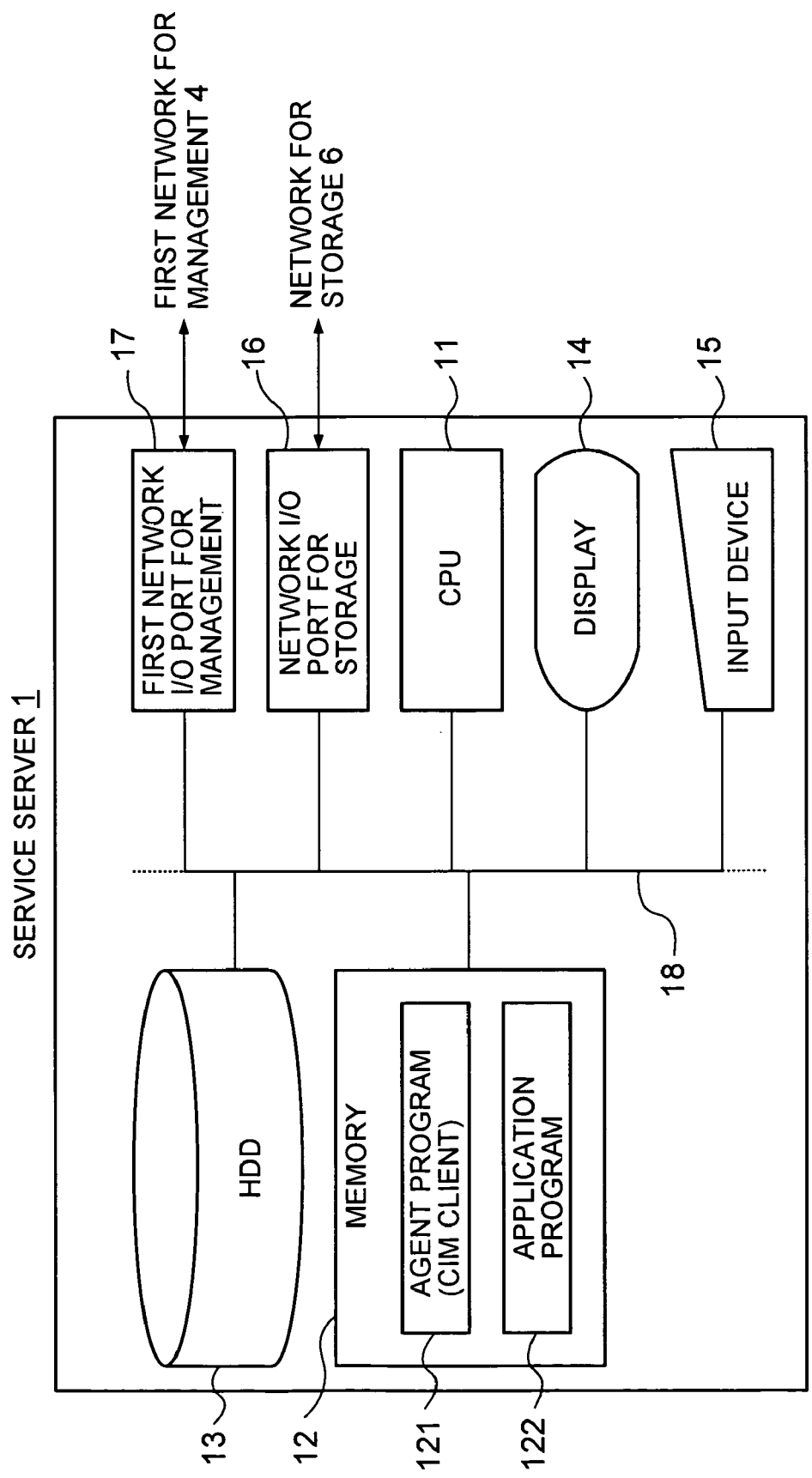
FIG. 2 is a schematic diagram of service server 1.

FIG. 2 is a schematic diagram of the service server 1. As illustrated, the service server 1 includes CPU 11, memory 12 which functions as a work area of the CPU 11, HDD 13 which stores various programs and data, display 14, input device 15 such as keyboard, and mouse, network I/O port for storage 16 which establishes connection with the network for storage 6, the first network I/O port for management 17 which establishes connection with the first network for management 4, and bus 18 which interconnects those elements 11 to 17. The CPU 11 loads agent program 121 and application program 122 stored in the HDD 13 into the memory 12, and executes those programs.

The agent program 121 is a program which requests the management server 2 to create (allocate) a volume utilizing the interface defined by the CIM. With this program, the service server 1 functions as a CIM client. The agent program 121 is a program to notify the management server 2 of a setting (hardware configuration, software configuration) of the program's own device according to a predetermined protocol (for example, SNMP, unique protocol, or the like).

The application program 122 is a program to perform a predetermined service processing (service DB, archive, or the like) utilizing the volume in the storage system 3, which has been allocated to the program's own device by the management server. With this program, the service server 1 functions as a host of the storage system 3.

The management server 2 creates a volume in the storage system 3 according to the volume creation request accepted from the service server 1, and simultaneously sets a path between the volume thus created and the service server 1. Then, the volume is allocated to the service server 1.

Figure 3:
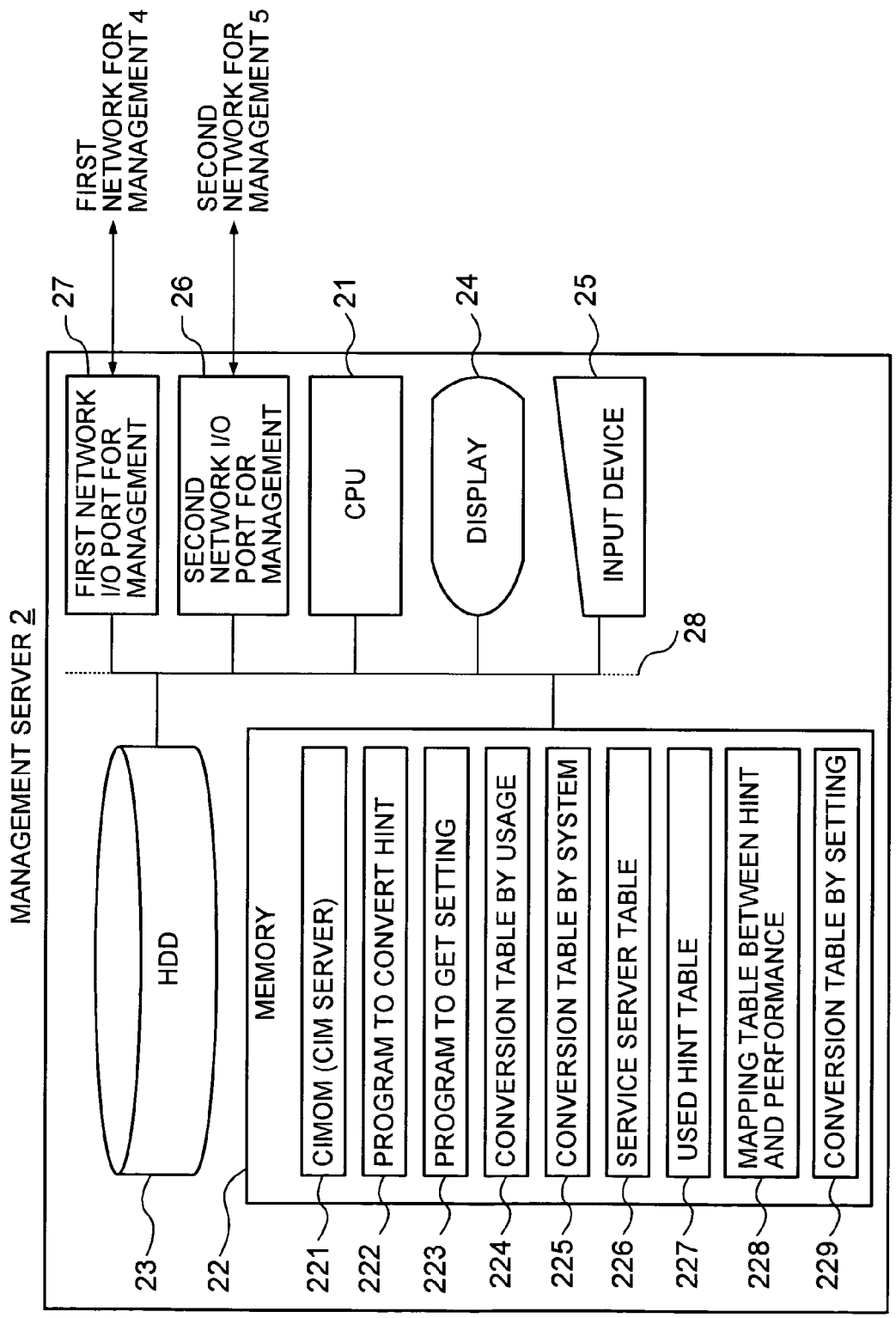
FIG. 3 is a schematic diagram of management server 2.

FIG. 3 is a schematic diagram of the management server 2. As illustrated, the management server 2 includes CPU 21, memory 22 which functions as a work area of the CPU 21, HDD 23 which stores various programs and data, display 24, input device 25 such as keyboard and mouse, the second network I/O port for storage 26 which establishes connection with the second management network 5, the first network I/O port for management 27 which establishes connection with the first network for management 4, and bus 28 which interconnects those elements 21 to 27. The CPU 21 loads in the memory 22, CIMOM (CIM Object Manager) 221, a program to convert hint 222, and a program to get setting 223, those being stored in the HDD 23, and executes those programs. Furthermore, the CPU 21 reads out from the HDD 12 and loads on the memory 13, a conversion table by usage 224, a conversion table by system 225, a service server table 226, a used hint table 227, a mapping table between hint and performance 228, and a conversion table by setting 229. Here, it is to be noted that the mapping table between hint and performance 228, and the conversion table by setting 229 are used in modifications of the present embodiment. Those tables are not used in the present embodiment.

The CIMOM 221 is a program to accept a volume creation request from the service server 1 by use of the interface defined by the CIM. With this program, the management server 2 functions as a CIM server. In addition, according to the volume creation request accepted from the service server 1, the CIMOM 221 creates the volume in the storage system 3, in cooperation with the program to convert hint 222 and the program to get setting 223, and simultaneously sets a path between the volume thus created and the service server 1.

The program to convert hint 222 utilizes the conversion table by usage 224 and the conversion table by system 225, so as to convert the evaluation hint value of the hint included in the volume creation request accepted from the service server 1, into a performance hint value. Here, the evaluation hint value is a hint value which is determined by the administrator of the service server 1, considering a service usage and the like of the service server 1. On the other hand, the performance hint value is a hint value which is used to determine a performance and a setting of the volume created in the storage system 3.

The program to get setting 223 is a program which utilizes a predetermined protocol (for example, SNMP or unique protocol), so as to obtain setting of the service server 1 (hardware setting, software setting) from the service server 1. The hardware setting of the service server 1 includes a redundant component employed by the service server 1 (for example, whether it is stand-alone configuration or cluster configuration), I/O performance with respect to the storage network 6, and the like. The software setting includes a service usage of the application program 122 (for example, whether it is service DB or archive, and the like).

The conversion table by usage 224 registers a correspondence between the evaluation hint value and an interim hint value, by service usage of the service server 1, with respect to each hint used for creating the volume. Here, the interim hint value is a hint value positioned at the intermediate stage in converting the evaluation hint value into the performance hint value. For example, in the case where the service usage of the service server 1 is a service DB, the volume is required to have a high throughput capacity for searching. On the other hand, in the case where the service usage is an archive, a high storage performance is required rather than the searching throughput. Therefore, even if the evaluation hint value is for the same hint, the performance required for the volume is varied depending on the service usage of the service server 1. By use of the conversion table by usage 224, the program to convert hint 222 converts the evaluation hint value of the hint included in the volume creation request accepted from the service server 1, into an interim hint value suitable for the service usage of the service server 1. The conversion table by usage 224 registers an interim hint value which is determined, for example, by an administrator who has sufficient skills as to the volume creation based on his or her experiences.

FIGS. 5A, 5B, and 5C are diagrams schematically showing the conversion tables by usage 224A to 224C. As illustrated, each of the conversion tables by usage 224A to 224C is provided by hint which is used for volume creation, and each table registers a record 2240 by service usage. The record 2240 includes a field 2241 for registering the service usage, and a field 2242 provided by evaluation hint value, which registers an interim hint value provided in such a manner as being associated with the evaluation hint value. In the present embodiment, data availability, access latency, and access bandwidth are used as hints to be used for volume creation. Therefore, the conversion tables by usage 224A to 224C are prepared for the data availability, access latency, and access bandwidth, respectively.

FIG. 5A schematically shows a conversion table by usage 224A regarding the hint "Data Availability". Generally, the service usage "Archive" is required to have more availability, compared to the service usage "Service DB". Therefore, as shown in FIG. 5A, even when the evaluation hint value is the same, the interim hint value for the service usage "Archive" is set to be higher than the interim hint value for the service usage "Service DB".

FIG. 5B schematically shows a conversion table by usage 224B regarding the hint "Access Latency". Generally, the service usage "Service DB" is required to have a higher speed response, compared to the service usage "Archive". Therefore, as shown in FIG. 5B, even when the evaluation hint value is the same, the interim hint value for the service usage "Service DB" is set to be higher than the interim hint value for the service usage "Archive".

FIG. 5C schematically shows a conversion table by usage 224C regarding the hint "Access Bandwidth". Generally, the service usage "Service DB" is required to have a higher throughput, compared to the service usage "Archive". Therefore, as shown in FIG. 5C, even when the evaluation hint value is the same, the interim hint value for the service usage "Service DB" is set to be higher than the interim hint value for the service usage "Archive".

The conversion tables by system 225A and 225B register by hint used for volume creation, a correspondence between an interim hint value and a performance hint value, with respect to each storage system 3 used for volume creation. For example, when the performance of the storage system 3A is different from that of the storage system 3B, the performance of the volume to be created is varied even for the same evaluation hint value of the same hint. By use of the conversion table by system 225, the program to convert hint 222 converts the above interim hint value into a performance hint value suitable for the performance or the like of the storage system 3, the performance hint value being applied thereto to create a volume. It is to be noted that the conversion table by system 225 registers a performance hint value which is determined, for example, by an administrator who has sufficient skills as to the volume creation based on his or her experiences.

FIG. 6A and FIG. 6B are diagrams schematically showing conversion tables by system 225A and 225B. As illustrated, the conversion tables by system 225A and 225B are provided to the storage systems 3A and 3B, respectively, and each table registers a record 2250 by hint which is used for volume creation. The record 2250 includes a field 2251 which registers a hint item, and a field 2252 provided by interim hint value, which registers a performance hint value provided in such a manner as being associated with the interim hint value. In the present embodiment, data availability, access latency, and access bandwidth are used as hints which are used for volume creation. Therefore, the record 2250 is registered with respect to each of the data availability, access latency, and access bandwidth.

FIG. 6A schematically shows a conversion table by system 225A associated with the storage system (S1) 3A. In the present embodiment, the storage system (S1) 3A is an old model, and thus the performance thereof is low. Therefore, if a volume is created in the storage system (S1) 3A, using the interim hint value without a change as a performance hint value, an expected performance cannot be obtained. For this reason, a high performance hint value is allocated even to a low interim hint value, whereby a volume setting with a high performance is applied to the created volume, out of all the volume settings which may be implemented in the storage system (S1) 3A.

FIG. 6B schematically shows a conversion table by system 225B associated with the storage system (S2) 3B. In the present embodiment, the storage system (S2) 3B is a new model, and high in performance. Therefore, even if a volume is created in the storage system (S2) 3B using the interim hint value without a change as a performance hint value, a performance in line with expectations can be obtained. Therefore, a performance hint value having the same value as the interim hint value is allocated.

The service server table 226 registers the setting of the service server 1, which is obtained by the program to get setting 223 from the service server 1. FIG. 7 is a diagram schematically showing the service server table 226. As illustrated, the service server table 226 registers a record 2260 with respect to each service server 1. The record 2260 includes a field 2261 which registers an address of the service server 1, a field 2262 which registers a service usage of the application program 122 operated in the service server 1, a field 2263 which registers a performance (maximum I/O performance) of the service server 1, and a field 2264 which registers a redundant component employed by the service server 1. As the redundant component of the service server, there is a configuration such as stand-alone configuration including one computer, a cluster (Active-Passive) configuration including two computers, one being operated and the other being on standby, and a cluster (Active-Active) configuration, both being operated.

The used hint table 227 registers by the CIMOM 221, information regarding the hint value used for the volume creation. FIG. 8 is a diagram schematically showing the used hint table 227. As illustrated, the used hint table 227 registers a record 2270 with respect to each volume being created. The record 2270 includes a field 2271 which registers identification information (volume ID) of the volume, a field 2272 which registers an evaluation hint value and/or performance hint value of each hint used for creating the volume, and a field 2273 which registers an address of the service server 1 to which the volume is allocated.

The mapping table between hint and performance 228 registers correspondence between a performance hint value and a maximum I/O performance of the volume created by the performance hint value, as to each hint in the access bandwidth. FIG. 9A and FIG. 9B are diagrams schematically showing mapping tables between hint and performance 228A and 228B. As illustrated, the mapping tables between hint and performance 228A and 228B are respectively provided to the storage systems 3A and 3B, and each table registers a record 2280 with respect to each performance hint value. The record 2280 includes a field 2281 which registers a performance hint value in the access bandwidth, and a field 2283 which registers a maximum I/O performance of the volume created by the performance hint value.

FIG. 9A schematically shows the mapping table between hint and performance 228A associated with the storage system (S1) 3A. Furthermore, FIG. 9B schematically shows the mapping table between hint and performance 228B associated with the storage system (S2) 3B. In the present embodiment, the storage system (S1) 3A is an old model, and low in performance. On the other hand, the storage system (S2) 3B is a new model, and high in performance. Therefore, the storage system (S2) 3B is allocated with a higher maximum I/O performance than the storage system (S1) 3A, even when the performance hint value of the access bandwidth is the same.

It is to be noted here that the mapping table between hint and performance 228 is a table which is used in a modification of the present embodiment. Therefore, this table is not required in the present embodiment.

The conversion table by setting 229 registers a correspondence between the interim hint value and the adjusted hint value, with respect to each setting of the service server 1, as to a hint of data availability. FIG. 10 is a diagram schematically showing a conversion table by setting 229. As illustrated, the conversion table by setting 229 registers a record 2290 with respect to each setting of the service server 1. The record 2290 includes a field 2291 which registers the setting of the service server 1, and a field 2292 provided with respect to each interim hint value of data availability, the field registering an adjusted hint value associated with the interim hint value. Here, the adjusted hint value is a hint value positioned at the intermediate stage for converting the interim hint value to the performance hint value. For example, if the setting of the service server 1 is a cluster configuration, the service server 1 is required to have a high availability, compared to the case of stand-alone configuration. Therefore, even if the evaluation hint value of data availability is the same, the performance required for the volume is varied depending on the setting of the service server 1. By use of the conversion table by setting 229, the program to convert hint 222 converts the above interim hint value to an adjusted hint value suitable for the setting of the service server 1, with regard to the data availability. The conversion table by setting 229 registers an adjusted hint value which is determined, for example, by an administrator who has sufficient skills as to the volume creation based on his or her experiences.

The conversion table by setting 229 is a table which is used in a modification of the present embodiment. Therefore, this table is not required in the present embodiment.

Referring to FIG. 1 again, explanation will be continued. The storage system 3 creates a volume according to a directive accepted from the management server 2 via the second network for management 5. Then, a path to this volume is established in the service server 1 via the network for storage 6. Accordingly, the storage system 3 provides a volume which is used for service processing in the service server 1.

Figure 4:
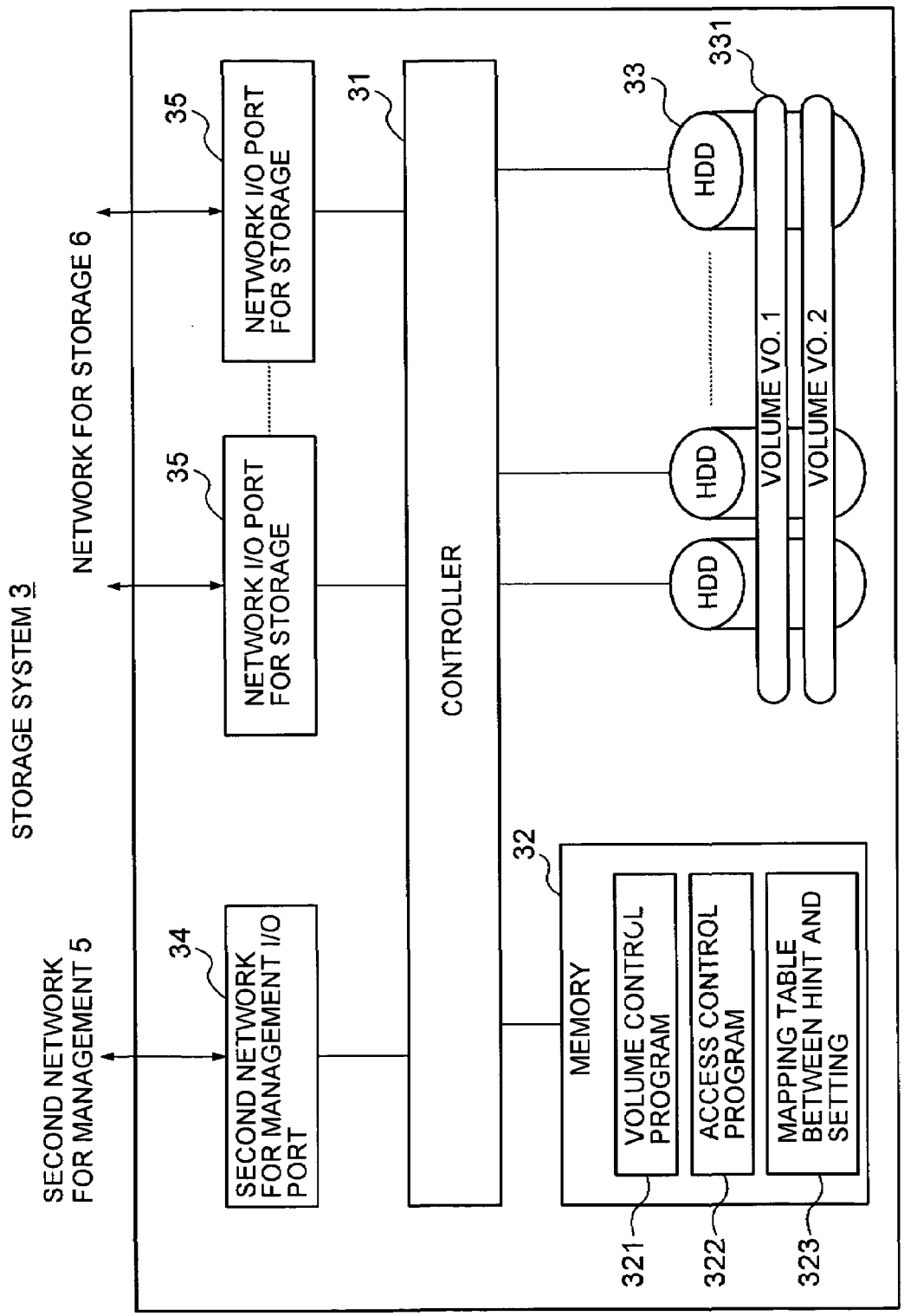
FIG. 4 is a schematic diagram of storage system 3A, 3B.

FIG. 4 is a schematic diagram of the storage system 3. As illustrated, the storage system 3 includes controller (CPU) 31, memory 32, at least one HDD 33, a second network I/O port for management 34 which establishes connection with the second network for management 5, and a plurality of network I/O ports for storage 35 which establish connection with the network for storage 6. The memory 32 stores a volume control program 321, an access control program 322, and a mapping table between hint and setting 323. The controller 31 executes the volume control program 321 and the access control program 322, which are stored in the memory.

The volume control program 321 is a program to allocate a volume 331 to the service server 1. In accordance with the directive accepted from the management server 2 via the second network for management 5, a volume 331 as a logical storage area including at least one HDD 33 is created. Furthermore, the volume 331 may be configured redundantly (RAID configuration) with multiple HDDs 33. Then, via the network for storage 6, a path is set between the volume 331 thus created and the service server 1.

The access control program 322 is a program to control access to the volume 331. The access control program 322 accepts from the service server 1 via the network for storage 6, an access to the volume 331 allocated to the service server 1, and controls read/write of data from/to the volume 331 having been allocated to the service server 1, according to the contents of the access.

The mapping table between hint and setting 323 registers a correspondence between the performance hint value and the setting of the volume 331 created by performance hint value, with respect to each hint used for creating the volume. FIG. 11 is a diagram schematically showing a mapping table between hint and setting 323. As illustrated, the mapping table between hint and setting 323 includes a record 3230 for each performance hint value. The record 3230 has a field 3231 which registers a performance hint value, a field 3232 which registers a redundant component applied to the volume when the hint value registered in the field 3231 is a performance hint value of data availability, a field 3233 which registers an operation mode (constant operation, power-saving (constantly), power-saving (nighttime), or the like) when the hint value registered in the field 3231 is a performance hint value of access latency, and a field 3234 which registers the number of ports of the network I/O port for storage applied to the volume when the hint value registered in the field 3231 is a performance hint value of access bandwidth. In addition, the field 3232 includes a sub field 32321 which registers RAID level applied to the volume when the performance hint value of data availability is a hint value registered in the field 3231, and a field 32322 which registers a flag indicating whether or not a remote copy is applied to the volume when the performance hint value of data availability is the hint value registered in the field 3231.

As shown in FIG. 11, the larger the performance hint value of data availability is, the higher availability of RAID level is selected, and in addition, a remote copy is applied. The larger the performance hint value of access latency is, the higher response of the operation mode is selected. Furthermore, the larger the performance hint value of access bandwidth is, the more network I/O port for storage 35 is utilized.

(2) System Operation Overview

Figure 13:
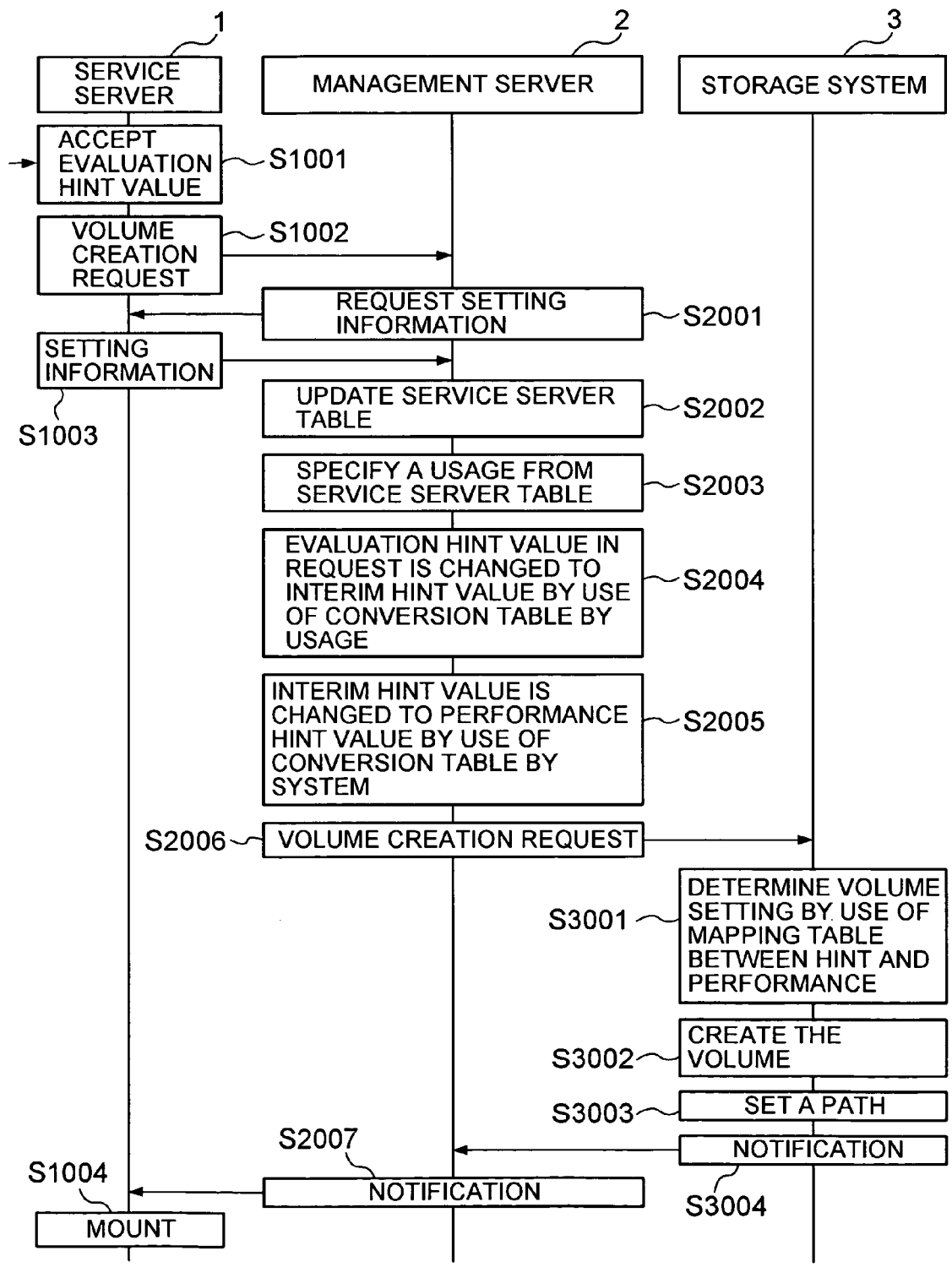
FIG. 13 is a diagram to explain an operation of the computer system to which the first embodiment of the present invention is applied.

An operation of the computer system according to the present embodiment will be explained. FIG. 13 is a diagram to explain the operation of the computer system to which the first embodiment of the present invention is applied. For ease of explanation, the following explanation will be made assuming that processing, which is to be performed by a CPU (or a controller) according to a program, is carried out by the program itself.

Figure 12:
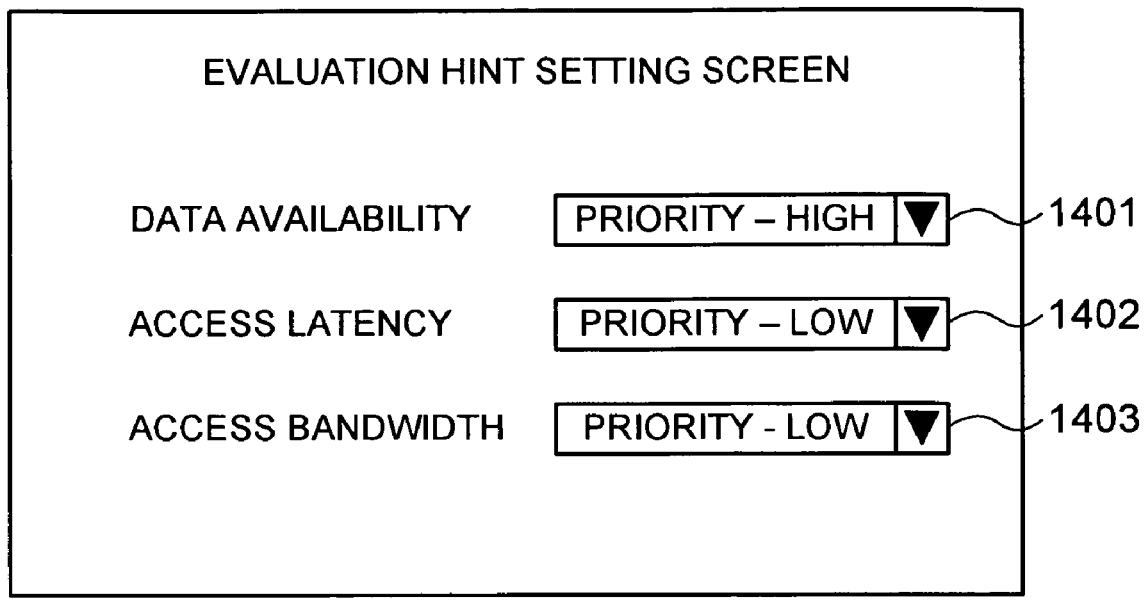
FIG. 12 is an illustration showing an example of screen image for setting an evaluation hint which is displayed by agent program 121 on display 14.

In the service server 1, the agent program 121 accepts from an administrator via the display 14 and input device 15, a designation of the storage system 3 which creates a volume to be used by the application program 122, and a designation of evaluation hint value with respect to each hint used for creating the volume (S1001) It is also possible to configure such that a designation of expression which can be intuitively understood by the administrator can be accepted, instead of accepting the designation of evaluation hint value. FIG. 12 is an illustration showing an example of screen image for setting an evaluation hint which is displayed by the agent program 121 on the display 14. In this particular example, selection columns 1401 to 1403 are provided for accepting a designation via expression, such as priority high, medium, and low, with respect to each of the items, data availability, access latency, and access bandwidth, and those expressions being able to be intuitively understood by the administrator. For this case, the agent program 121 is provided with a conversion table which converts the expression intuitively understood by the administrator into a specific evaluation hint value, and with this table, an expression being designated is converted into an evaluation hint value.

Next, in the service server 1, when the agent program 121 accepts a designation of the storage system 3 in which a volume is to be created, and a designation of evaluation hint value for each hint used for creating the volume, the agent program 121 generates a volume creation request including those designations. Then, the agent program 121 transmits this volume creation request to the management server 2 via the first network for management 4 (S1002).

In the management server 2, when the CIMOM 221 receives the volume creation request from the service server 1 via the first network for management 4, the CIMOM 221 refers to the service server table 226 and checks whether or not a record 2260 of the service server 1 is registered as a source of sending the volume creation request. If the record is not registered, the program to get setting 223 is notified of that result. In receipt of this notification, the program to get setting 223 generates a setting information request addressed to the service server 1 as a source of sending the volume creation request, and transmits this setting information request to the service server 1 as a source of sending the volume creation request via the first network for management 4 (S2001).

In the service server 1, when the agent program 121 receives the setting information request from the management server 2 via the first network for management 4, the agent program 121 obtains the setting information of its own device (hardware setting, software setting), for example, from the OS (Operating System) that is operating in the own device. Then, the agent program 121 transmits the setting information thus obtained to the management server 2 via the first network for management 4 (S1003).

In the management server 2, when the program to get setting 223 receives the setting information from the service server 1 via the first network for management 4, the program adds a record 2260 to the service server table 226, registers the address of the service server 1 as a source of sending the setting information in the field 2261 of the record 2260, registers in the field 2262 a service usage of the application program 122 in the service server 1, registers a maximum I/O performance of the service server 1 included in the setting information, and registers in the field 2264, a redundant component of the service server included in the setting information (S2002). Thereafter, the program to get setting 223 notifies the CIMOM 221 that the service server table 226 has been updated.

In the meantime, when the CIMOM 221 confirms that the record 2260 of the service server 1 as a source of sending the volume creation request is registered in the service server table 226, the CIMOM 221 specifies a service usage registered in the field 2262 of the record 2260 (S2003). Then, the CIMOM 221 notifies the program to convert hint 222 of the service usage thus specified, together with the evaluation hint value of the hint included in the source of sending the volume creation request and designation information of the storage system 3.

In receipt of this notification, the program to convert hint 222 refers to the record 2240 of the service usage thus specified in any of the conversion tables by usage 224A to 224C corresponding to the hint for each evaluation hint value included in the source of sending the volume creation request, and specifies an interim hint value registered in the field 2242 associated with the evaluation hint value of the hint. Then, each of the evaluation hint value of the hint included in the source of sending the volume creation request is converted into the interim hint value thus specified (S2004).

Next, with respect to each interim hint of the hint converted in S2004, the program to convert hint 222 refers to the record 2250 in any of the conversion tables by system 225A, 225B corresponding to the storage system 3 specified by the designation information notified from the CIMOM 221, and specifies a performance hint value registered in the field 2252 associated with the interim hint value of the hint. Then, the program to convert hint 222 changes each interim hint value of the hint converted in S2004 to the performance hint value thus specified (S2005). Then, the program to convert hint 222 notifies the CIMOM 221 of each performance hint value of the hint thus obtained.

Next, when the CIMOM 221 receives from the program to convert hint 222, the performance value associated with the evaluation hint value of each hint included in the volume creation request, according to the interface (CIM or a unique interface) employed by the stored system 3 specified by the designation information included in the volume creation request, the CIMOM 21 newly creates a volume creation request including the address information of the service server 1 as a source of requesting the volume creation and a performance hint value associated with the evaluation hint value of each hint, and transmits this newly created request to the storage system 3 specified by the designation information included in the volume creation request, via the second network for management 5 (S2006).

In the meantime, in the storage system 3, when the volume control program 321 receives the volume creation request from the management server 2 via the second network for management 5, the volume control program 321 refers to the mapping table between hint and setting 323, and specifies a volume setting associated with each performance hint value of the hint included in the volume creation request (S3001). Specifically, the following processing is carried out with respect to each performance hint value of the hint. In other words, a record 3230 is specified in which the performance hint value of the hint is registered in the field 3231. Further in this record 3230, volume settings (redundant component, operation mode, the number of ports being used) registered in the fields 3232 to 3234 associated with the hint are specified. Then, the volume control program 321 creates a volume 331 employing the volume setting specified in S3001, utilizing at least one HDD 33 (S3002). Next, the volume control program 321 sets a path using the network for storage 6, between the service server 1 specified by the address information included in the volume creation request, and the volume 331 thus created (S3003), and notifies the management server 2 of the path via the second network for management 5 (S3004).

In the management server 2, when the CIMOM 221 receives a notification of path setting from the storage system 3, the CIMOM 221 transmits the notification to the service server 1 as a source of requesting volume creation, via the first network for management 4 (S2007). Then, a record 2270 is added to the used hint table 227, and in the record 2270 thus added, identification information of the volume 331 being created, used hint value and/or performance hint value of each hint used for creating the volume 331, and the address information of the service server 1 to which the volume 331 is allocated are registered.

In the service server 2, when the agent program 121 receives a notification as to the path from the management server 2 via the first network for management 4, the agent program 121 mounts the volume 331 in accordance with this path. Then, the agent program 121 notifies the application program 122 of the volume 331 thus mounted (S1004). Accordingly, the application program 122 is allowed to use the volume 331.

The first embodiment of the present invention has been explained as described above.

According to the present embodiment, it is not necessary for the administrator to grasp the meaning represented by each performance hint value (a performance and a setting of the storage system 3 which is created based on the performance hint value), with respect to each storage system 3. Therefore, it is possible to reduce a burden on the administrator in creating volume.

Furthermore, according to the present embodiment, the setting information of the service server 1 can be automatically obtained, and the evaluation hint value set by the administrator is converted into an interim hint value in accordance with this setting information. Therefore, it is not necessary for the administrator to grasp in advance a performance hint value suitable for the service usage of the service server 1. Accordingly, a burden placed on the administrator in creating the volume can be further reduced.

In addition, in the present embodiment, the management server 2 may be connected to the storage system 3 and the service server 1 by way of one port. In addition, in the present embodiment, a network interface to establish connection with the network is not limited to the port.

Modified Example 1 of the First Embodiment

Next, a modified example 1 of the first embodiment will be explained. In the modified example 1, the performance hint value in the access bandwidth is adjusted, by use of the service server table 226 and the mapping table between hint and performance 228. In other words, in S2005 of FIG. 13, the program to convert hint 222 of the management server 2 specifies from any of the performance mapping tables between hint and performance 228A, 228B, a record 2280 in which a performance hint value of the access bandwidth is registered in the filed 2281, the performance hint value being obtained by the conversion table by system 225, associated with the storage system 3 specified by the designation information included in the volume creation request. In addition, the program to convert hint 222 specifies from the service server table 226, a record 2260 in which the address of the service server 1 as a source of sending the volume request is registered in the field 2261. Then, the program to convert hint 222 compares the I/O performance of the volume registered in the field 2282 of the record 2280 thus specified and the maximum I/O performance of the service server 1 registered in the field 2263 of the record 2260 thus specified. If the maximum I/O performance of the service server 1 is smaller than the I/O performance of the volume, the largest performance hint value is specified out of the performance hint values respectively associated with the hint values corresponding to the I/O performance equal to or less than the value of the maximum I/O performance of the service server 1, from any of the mapping tables between hint and performance 228A, 228B associated with the storage system 3 that is specified by the designation information included in the volume creation request. Then, the performance hint value of access bandwidth obtained by use of the conversion table by system 225 is changed to the performance hint value thus specified.

With the configuration above, it is possible to prevent a situation where a volume 331 having an I/O performance higher than the maximum I/O performance of the service server 1 is created, thus preventing a creation of over-designed volume 331 for the service server 1.

Modified Example 2 of the First Embodiment

Next, a modified example 2 of the first embodiment will be explained. In the modified example 2, an interim hint value of data availability is adjusted by use of the service server table 226 and the conversion table by setting 229. In other words, in S2005 of FIG. 13, the program to convert hint 222 of the management server 2 specifies from the service server table 226, a record 2260 in which the address of the service server 1 as a source of sending the volume creation request is registered in the field 2261, and further specifies setting information of the service server 1 registered in the field 2264. Next, the program to convert hint 222 specifies from the conversion table by setting 229, a record 2290 in which the setting information thus specified is registered in the field 2291. From thus specified record 2290, an adjusted hint value is specified, which is registered in the field 2292 in such a manner as being associated with the interim hint vale of data availability obtained by use of the conversion table by usage 224A. Then, the interim hint value of data availability is changed to thus adjusted hint value, as an interim hint value of data availability.

Accordingly, since the interim hint value of the data availability can be adjusted to be suitable for the setting of the service server 1, it is possible to employ a redundant component of the volume, being appropriate for the service server 1.

Second Embodiment

A computer system to which the second embodiment of the present invention is applied will be explained with reference to the accompanying drawings.

(1) System Configuration

The computer system of the present embodiment is different from that of the first embodiment in the point that a management server 2A is employed instead of the management server 2. Other parts of the configuration are the same as those in the first embodiment.

Figure 14:
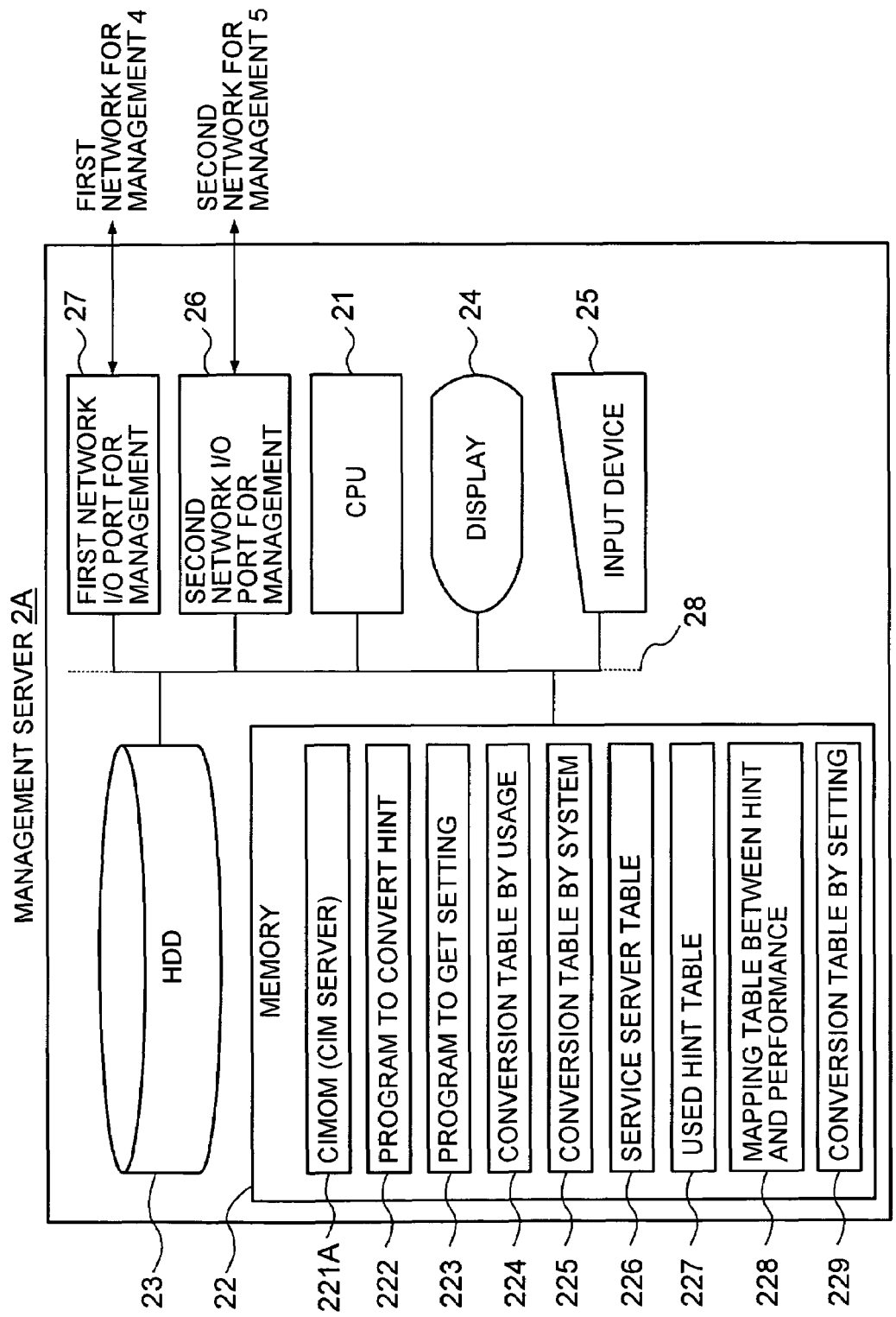
FIG. 14 is a schematic diagram of the management server 2A.

FIG. 14 is a schematic diagram of the management server 2A. As illustrated, the management server 2A of the present embodiment is different from the management server 2 in the first embodiment as shown in FIG. 3, in the point that CIMOM 221A is provided in place of CIMOM 221. The CIMOM 221A includes a storage pool management function (virtual storage server), in addition to the functions of the CIMOM 221 of the first embodiment. Here, the "storage pool" indicates a storage area assuming multiple storage systems as one pool. With the storage pool management function, the CIMOM 221A obtains from the volume control program 321 of the storage system 3, information regarding the storage area, such as already-created volume and free space, according to the interface (CIM or a unique interface) employed by the storage system 3, and unifies the management of those information items. In addition, with the storage pool management function, the CIMOM 221A decides a storage system 3 as a destination for creating the volume.

(2) System Operation Overview

Figure 15:
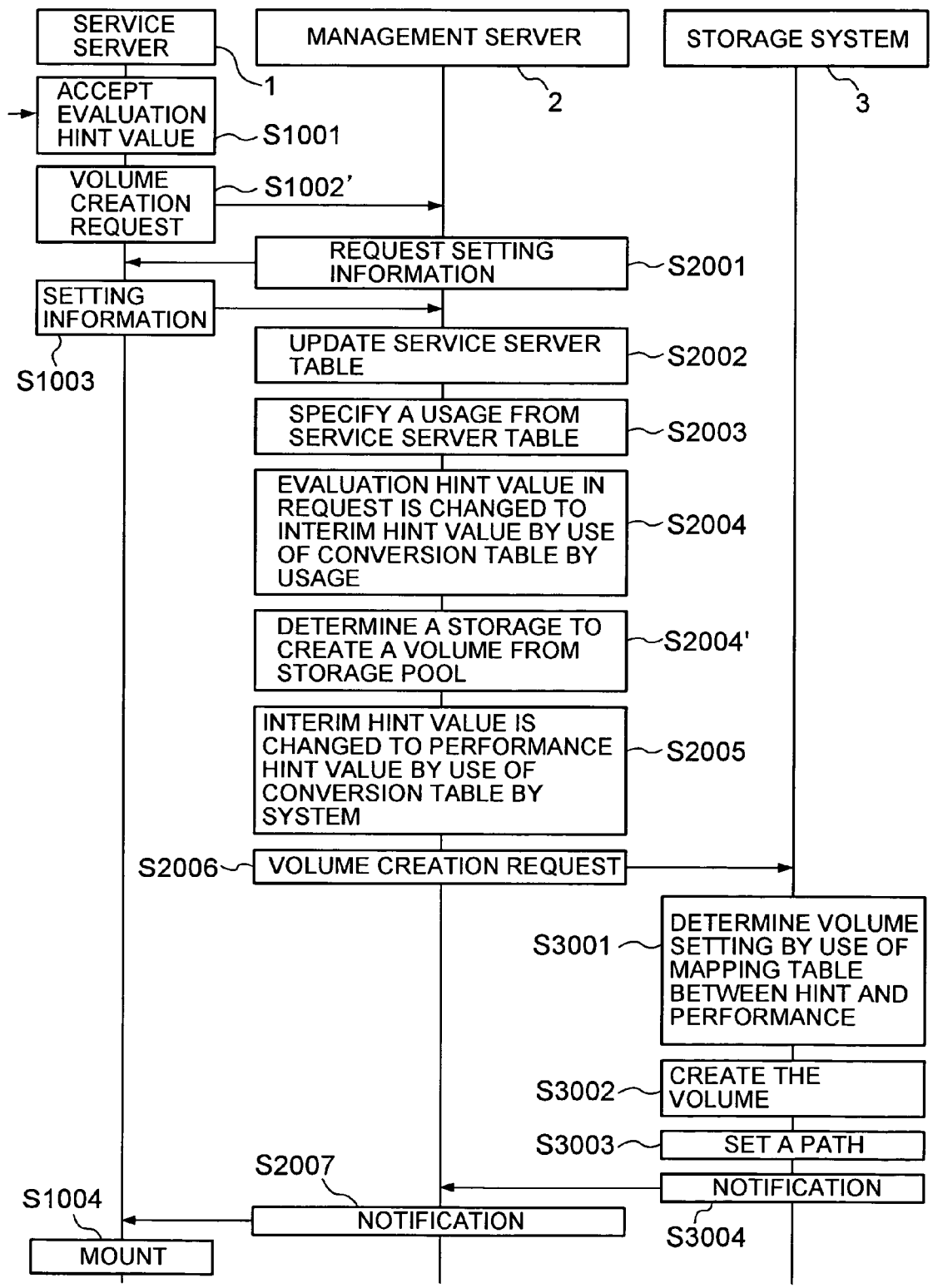
FIG. 15 is a diagram to explain an operation of the computer system to which the second embodiment of the present invention is applied.

An operation of the computer system according to the present embodiment will be explained. FIG. 15 is a diagram to explain the operation of the computer system to which the second embodiment of the present invention is applied. As illustrated, the operation of the computer system according to the present embodiment is different from that of the first embodiment as shown in FIG. 13 in the point that S1002' is provided in place of S1002, and S2004' is provided between S2004 and S2005.

In S1002', the agent program 121 of the service server 1 generates a volume creation request, and transmits this volume creation request to the management server 2 via the first network for management 4. At this stage, it is not necessary to include a designation of storage system 3 in which the volume is to be created.

In S2004', the CIMOM 221 of the management server 2 checks the information regarding the storage area of each storage system 3 being uniformly managed, and determines a volume having a large free space as a storage system 3 for a destination for creating the volume. Accordingly, the program to convert hint 222 of the management server 2 refers to the record 2250 of the hint in any of the conversion tables by system 225A, 225B associated with the storage system 3 being the destination for creating the volume decided by the CIMOM 221 in S2004', with respect to each interim hint value obtained in S2004, and specifies a performance hint value registered in the field 2252 associated with the interim hint value of the hint. Then, each interim hint value converted in S2004 is changed to the performance hint value thus specified.

The second embodiment of the present invention has been explained as described above.

According to the present embodiment, it is possible for the administrator to create a volume in the management server 2, without regard to individual storage systems 3A, 3B.

It is to be noted that the present invention is not limited to the above embodiment, and various modifications may be applicable within the scope of the invention. For example, in the above embodiment, the first network for management 4 and the second network for management 5 may be configured as the same network. In addition, the network for storage 6 may also serve as the first network for management 4 and/or the second network for management 5.

What is claimed is:

1. A computer system comprising a host computer, at least one storage system which provides a volume to said host computer, a management computer connected via a network with said storage system and said host computer, wherein,
   said host computer comprises,
      a first port for management which establishes connection with said management computer,
      a first port for storage which establishes connection with said storage system,
      a first processor, and
      a first memory, wherein,
      said first processor performs,
         a process which transmits a first volume creation request including a designation of an evaluation hint value and the storage system, to said management computer via said first port for management, and
         a process which accesses the volume via said first port for storage, according to a path received from said management computer via said first port for management, and
   said management computer comprises,
      a second port for management which establishes connection with said network,
      a second processor, and
      a second memory, wherein,
      said second memory holds a conversion table by system, indicating a correspondence between the evaluation hint value and a performance hint value, with respect to each of said storage system, and
      said second processor performs,
         a process which converts the evaluation hint value included in the first volume creation request received from said host computer via said second port for management, into the performance hint value associated with the evaluation hint value, by use of the conversion table by system being associated with the storage system which is designated in the first volume creation request,
         a process which transmits a second volume creation request including the performance hint value thus converted to the storage system designated by said first volume creation request via the second management port, and
         a process which transmits a path between the volume created in the storage system designated by said first volume creation request and said host computer which transmitted the first volume creation request, to the host computer via said second port for management, and
   said storage system comprises,
      a second port for storage which establishes connection with said host computer,
      a third port for management which establishes connection with said management computer,
      a third CPU, and
      a third memory, wherein,
      said third memory holds a mapping table between hint and setting which indicates a correspondence between the performance hint value and a volume setting, and
      said third CPU performs,
         a process which specifies, by use of said mapping table between hint and setting, the volume setting associated with the performance hint value included in the second volume creation request received from said management computer via said third port for management, and creates a volume having the volume setting thus specified, and
         a process which accepts an access from said host computer to said volume thus created via said second port for storage,
   said first processor further performs a process which transmits to said management computer via said first port for management, host setting information including a service usage of service processing performed by said host computer,
   said second memory holds a conversion table by usage indicating a correspondence between the evaluation hint value and an interim hint value with respect to each usage of said service processing, and
   said second processor converts the evaluation hint value included in said first volume creation request to an interim hint value, in the process to convert said evaluation hint value into a performance hint value, by use of said conversion table by usage associated with the service usage included in the host setting information received from said host computer via said second port for management, and then, converts said interim hint value into a performance hint value associated with the evaluation hint value having a value being identical to the interim hint value, by use of said conversion table by system associated with the storage system designated in said first volume creation request.

2. The computer system according to claim 1, wherein,
   said host setting information includes information regarding a performance of said host computer,
   said second memory further holds a mapping table between hint and performance indicating a correspondence between the performance hint value and a performance of the volume created based on the performance hint value, with respect to each of said storage system, and
   said second processor further performs,
   a process which specifies the performance of the volume associated with the performance hint value obtained from the evaluation hint value included in said first volume request, by use of said mapping table between hint and performance associated with the storage system designated in said first volume creation request, and when the performance of the volume thus specified is higher than the performance of said host computer included in said host setting information, said performance hint value is changed so that the performance of the volume to be created becomes lower.

3. The computer system according to claim 1, wherein,
said host setting information includes information regarding a redundant component employed by said host computer,
said second memory further holds a conversion table by setting indicating a correspondence between the interim hint value and an adjusted hint value, with respect to each of the redundant component employed by said host computer, and
said second processor changes the interim hint value obtained from the evaluation hint value included in said first volume creation request in the process to convert said evaluation hint value into the performance hint value, to the adjusted hint value of the interim hint value associated with the redundant component included in said host setting information of said conversion table by setting, and then, converts the interim hint value thus changed to a performance hint value.

4. The computer system according to claim 1, wherein,
said host computer further comprises an input device, and
said first processor further performs a process to convert information representing volume creation guidance inputted into said input device into an evaluation hint value.

5. A computer system comprising a host computer, at least one storage system which provides a volume to said host computer, a management computer connected via a network with said storage system and said host computer, wherein,
said host computer comprises,
  a first port for management which establishes connection with said management computer,
  a first port for storage which establishes connection with said storage system,
  a first processor, and
  a first memory, wherein,
  said first processor performs,
    a process which transmits a first volume creation request including a designation of an evaluation hint value and the storage system, to said management computer via said first port for management, and
    a process which accesses the volume via said first port for storage, according to a path received from said management computer via said first port for management, and
said management computer comprises,
  a second port for management which establishes connection with said network,
  a second processor, and
  a second memory, wherein,
  said second memory holds a conversion table by system, indicating a correspondence between the evaluation hint value and a performance hint value, with respect to each of said storage system, and
  said second processor performs,
    a process which converts the evaluation hint value included in the first volume creation request received from said host computer via said second port for management, into the performance hint value associated with the evaluation hint value, by use of the conversion table by system being associated with the storage system which is designated in the first volume creation request,
    a process which transmits a second volume creation request including the performance hint value thus converted to the storage system designated by said first volume creation request via the second management port, and
    a process which transmits a path between the volume created in the storage system designated by said first volume creation request and said host computer which transmitted the first volume creation request, to the host computer via said second port for management, and
said storage system comprises,
  a second port for storage which establishes connection with said host computer,
  a third port for management which establishes connection with said management computer,
  a third CPU, and
  a third memory, wherein,
  said third memory holds a mapping table between hint and setting which indicates a correspondence between the performance hint value and a volume setting, and
  said third CPU performs,
    a process which specifies, by use of said mapping table between hint and setting, the volume setting associated with the performance hint value included in the second volume creation request received from said management computer via said third port for management, and creates a volume having the volume setting thus specified, and
    a process which accepts an access from said host computer to said volume thus created via said second port for storage,
said first processor,
in said process which transmits the first volume creation request, transmits to said management computer via said first port for management, the first volume creation request which includes the evaluation hint value without including a designation of the storage system, in place of the first volume creation request including designation of the evaluation hint value and the storage system, and
said second processor,
further performs a process to manage a status of each of said storage system, and in receipt of the first volume creation request from said host computer via said second port for management, said second processor determines the storage system as a destination for creating the volume based on the status of each of said storage system, and to set the storage system thus determined as a storage system designated by said first volume creation request.

6. A management computer which creates a volume in at least one storage system, and allocates the volume to a host computer, comprising,
a network interface which is connectable with a network being connected to said host computer and said storage system,
a processor connected to said network interface, and
a memory connected to said processor, wherein,
said memory holds a conversion table by system indicating a correspondence between an evaluation hint value an a performance hint value with respect to each of said storage system, and
said processor performs,
  a process which converts the evaluation hint value included in a first volume creation request into a performance hint value associated with the evaluation hint value, by use of said conversion table by system associated with the storage system designated as a destination for creating the volume in said first volume creation request received from said host computer via said network interface, a process which transmits via said network interface, a second volume creation request including said performance hint value thus converted to the storage system designated as a destination for creating the volume in said first volume creation request, and a process which transmits to said host computer via said network interface, a path between the volume created in the storage system designated as a destination for creating the volume in said first volume creation request, and said host computer which transmits said first volume creation request, said memory further holds a conversion table by usage indicating a correspondence between the evaluation hint value and an interim hint value, with respect of each usage of service processing performed by said host computer, said processor, in said process which converts the evaluation hint value, converts the evaluation hint value included in said first volume creation request to an interim hint value, by use of said conversion table by usage associated with the service usage included in host setting information received from said host computer via said network interface, and then, converts said interim hint value into a performance hint value associated with the performance hint value having a value identical to the interim hint value, by use of said conversion table by system associated with the storage system designated as a destination for creating the volume in said first volume creation request.

7. The management computer according to claim 6, wherein, said memory further holds a mapping table between hint and performance indicating a correspondence between the performance hint value and a performance of the volume created based on the performance hint value, with respect to each of said storage system, and said processor further performs, a process which specifies the performance of the volume associated with the performance hint value obtained from the evaluation hint value included in said first volume creation request, by use of said mapping table between hint and performance associated with the storage system designated as a destination for creating the volume in said first volume creation request, and when the performance of the volume thus specified is higher than the performance of said host computer included in said host setting information, said performance hint value is changed so that the performance of the volume to be created becomes lower.

8. The management computer according to claim 6, wherein, said memory further holds a conversion table by setting indicating a correspondence between the interim hint value and an adjusted hint value, with respect to each of the redundant component employed by said host computer, and said processor, in the process to convert said evaluation hint value into a performance hint value, changes the interim hint value obtained from the evaluation hint value included in said first volume creation request to the adjusted hint value of the interim hint value associated with the redundant component of the host computer included in said host setting information of said conversion table by setting, and then, converts the interim hint value thus changed to a performance hint value.

9. A management computer which creates a volume in at least one storage system, and allocates the volume to a host computer, comprising, a network interface which is connectable with a network being connected to said host computer and said storage system, a processor connected to said network interface, and a memory connected to said processor, wherein, said memory holds a conversion table by system indicating a correspondence between an evaluation hint value an a performance hint value with respect to each of said storage system, and said processor performs, a process which converts the evaluation hint value included in a first volume creation request into a performance hint value associated with the evaluation hint value, by use of said conversion table by system associated with the storage system designated as a destination for creating the volume in said first volume creation request received from said host computer via said network interface, a process which transmits via said network interface, a second volume creation request including said performance hint value thus converted to the storage system designated as a destination for creating the volume in said first volume creation request, and a process which transmits to said host computer via said network interface, a path between the volume created in the storage system designated as a destination for creating the volume in said first volume creation request, and said host computer which transmits said first volume creation request, said processor further performs a process which manages a status of each of said storage system, and in receipt of the first volume creation request from said host computer via said network interface, determines a storage system as a destination for creating the volume based on the status of each of said storage system, and sets the storage system thus determined as a storage system designated by said first volume creation request.

10. A storage area allocation method in which a management computer connected via a network to a host computer and at least one storage system which provides a volume to said host computer, creates the volume to said storage system, and allocates the volume to said host computer, wherein, said management computer, holds a conversion table by system indicating a correspondence between an evaluation hint value and a performance hint value, with respect to said storage system, converts the evaluation hint value included in the first volume creation request into a performance hint value associated with the evaluation hint value, by use of said conversion table by system associated with the storage system designated as a destination for creating the volume in the first volume creation request received from said host computer, transmits a second volume creation request including the performance hint value thus converted to a storage system being designated as a destination for creating the volume in said first volume creation request, and transmits a path between the volume created in the storage system designated as a destination for creating the volume in said first volume creation request and said host computer to which said first volume creation request is transmitted, said management computer further holds a conversion table by usage indicating a correspondence between the evaluation hint value and an interim hint value, with respect of each usage of service processing performed by said host computer, in the process to convert said evaluation hint value into the performance hint value, converts the evaluation hint value included in said first volume creation request into an interim hint value, by use of said conversion table by usage associated with the service usage included in host setting information received from said host computer via said network, and then, converts said interim hint value into a performance hint value associated with the evaluation hint value having a value being identical to the interim hint value, by use of said conversion table by system associated with the storage system designated as a destination for creating the volume in said first volume creation request.

11. The storage area allocation method according to claim 10, wherein, said management computer further holds a mapping table between hint and performance indicating a correspondence between the performance hint value and a performance of the volume created based on this performance hint value, with respect to each of said storage system, and specifies the performance of the volume associated with the performance hint value obtained from the evaluation hint value included in said first volume creation request, by use of said mapping table between hint and performance associated with the storage system designated as a destination for creating the volume in said first volume creation request, and when the performance of the volume thus specified is higher than the performance of said host computer included in said host setting information, said performance hint value is changed so that the performance of the volume to be created becomes lower.

12. The storage area allocation method according to claim 10, wherein, said management computer further holds a conversion table by setting indicating a correspondence between the interim hint value and an adjusted hint value, with respect to each of the redundant component employed by said host computer, and in the process to convert said evaluation hint value into a performance hint value, changes the interim hint value obtained from the evaluation hint value included in said first volume creation request to the adjusted hint value of the interim hint value associated with the redundant component of the host computer included in said host setting information of said conversion table by setting, and then, converts the interim hint value thus changed to a performance hint value.

13. A storage area allocation method in which a management computer connected via a network to a host computer and at least one storage system which provides a volume to said host computer, creates the volume to said storage system, and allocates the volume to said host computer, wherein, said management computer, holds a conversion table by system indicating a correspondence between an evaluation hint value and a performance hint value, with respect to said storage system, converts the evaluation hint value included in the first volume creation request into a performance hint value associated with the evaluation hint value, by use of said conversion table by system associated with the storage system designated as a destination for creating the volume in the first volume creation request received from said host computer, transmits a second volume creation request including the performance hint value thus converted to a storage system being designated as a destination for creating the volume in said first volume creation request, and transmits a path between the volume created in the storage system designated as a destination for creating the volume in said first volume creation request and said host computer to which said first volume creation request is transmitted, said management computer manages a status of each of said storage system, and in receipt of the first volume creation request from said host computer via said network interface, said management computer determines a storage system as a destination for creating the volume based on the status of each of said storage system, and sets the storage system thus determined as a storage system designated by said first volume creation request.

* * * * *